United States Patent
Tong et al.

(10) Patent No.: US 11,130,259 B1
(45) Date of Patent: Sep. 28, 2021

(54) DEVICE AND METHOD FOR ONLINE PREPARATION OF MODIFIED POLYLACTIC ACID MATERIAL WITH POLYLACTIC ACID MELT

(71) Applicants: COFCO (jilin) Bio-Chemical Technology CO., Ltd, Changchun (CN); Nutrition & Health Research Institute, COFCO Corporation, Beijing (CN); Jilin COFCO Biomaterial Co., Ltd, Changchun (CN); COFCO BIOTECHNOLOGY CO., LTD., Bengbu (CN)

(72) Inventors: Yi Tong, Beijing (CN); Yi Li, Beijing (CN); Kejia Xu, Beijing (CN); Bohao Li, Changchun (CN); Guoxing Zhao, Changchun (CN); Zhaoning Cui, Beijing (CN)

(73) Assignees: COFCO (JILIN) BIO-CHEMICAL TECHNOLOGY CO., LTD, Changchun (CN); NUTRITION & HEALTH RESEARCH INSTITUTE, COFCO CORPORATION, Beijing (CN); JILIN COFCO BIOMATERIAL CO., LTD., Changchun (CN); COFCO BIOTECHNOLOGY CO., LTD., Bengbu (CN)

( * ) Notice: Subject to any disclaimer, the term of this patent is extended or adjusted under 35 U.S.C. 154(b) by 0 days.

(21) Appl. No.: 17/136,979

(22) Filed: Dec. 29, 2020

(30) Foreign Application Priority Data

May 20, 2020 (CN) .......................... 202010431721.3

(51) Int. Cl.
| | | |
|---|---|---|
| B29B 9/12 | (2006.01) | |
| B29B 9/06 | (2006.01) | |
| C08K 3/26 | (2006.01) | |
| C08K 3/34 | (2006.01) | |
| C08L 67/04 | (2006.01) | |
| B29K 67/00 | (2006.01) | |
| B29K 105/00 | (2006.01) | |

(52) U.S. Cl.
CPC ................. *B29B 9/12* (2013.01); *B29B 9/06* (2013.01); *C08K 3/26* (2013.01); *C08K 3/346* (2013.01); *C08L 67/04* (2013.01); *B29K 2067/046* (2013.01); *B29K 2105/0005* (2013.01); *C08K 2003/265* (2013.01); *C08L 2205/03* (2013.01)

(58) Field of Classification Search
CPC .. C08K 3/26; C08L 67/04; B29B 9/06; B29B 9/12
See application file for complete search history.

(56) References Cited

FOREIGN PATENT DOCUMENTS

| CN | 107141743 A | 9/2017 |
|---|---|---|
| CN | 107603168 A | 1/2018 |

*Primary Examiner* — Edward J Cain
(74) *Attorney, Agent, or Firm* — Volpe Koenig

(57) ABSTRACT

The present disclosure relates to the technical field of polymer material, and discloses a device and method for online preparation of a modified polylactic acid material with a polylactic acid melt. The device comprises a twin-screw extruder, a first solid modifier hopper, a polylactic acid melt pipeline and a polylactic acid melt feedstock metering pump, wherein the first solid modifier hopper is connected with Zone I of the twin-screw extruder, the polylactic acid melt pipeline is connected with Zone IV of the twin-screw extruder. The method for online preparation of modified polylactic acid material with the device can avoid degradation of the polylactic acid caused by the secondary processing, improve mechanical property of the prepared polylactic acid and reduce production cost.

10 Claims, 1 Drawing Sheet

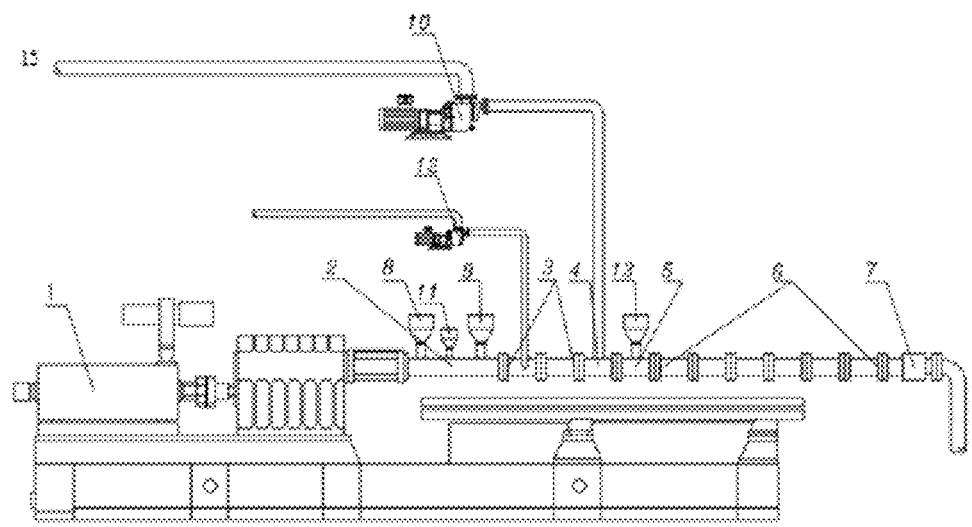

DEVICE AND METHOD FOR ONLINE PREPARATION OF MODIFIED POLYLACTIC ACID MATERIAL WITH POLYLACTIC ACID MELT

PRIORITY CLAIM & CROSS REFERENCE

The Application claims priority to the Chinese Application No. 202010431721.3, filed on May 20, 2020, entitled "Device and Method for Online Preparation of a Modified Polylactic Acid Material with a Polylactic Acid Melt", which is herein specifically and entirely incorporated by reference.

FIELD

The present disclosure relates to the technical field of polymer materials, in particular to a device and method for online preparation of a modified polylactic acid material with a polylactic acid melt.

BACKGROUND

The bio-based degradable polymer materials have rapidly developed along with the improvement of human consciousness and the increasing shortage of petroleum resources. Among the developed bio-based polymer materials, polylactic acid (PLA) is praised as one of the products with the most development potential, and has recently attracted extensive attention from the academic circles and industrial community.

PLA is mainly obtained by taking lactic acid which is a fermentation product of microorganisms as a monomer and polymerization reaction of the lactic acid, it is a non-toxic, non-irritant, high-molecular material with desirable biocompatibility and biodegradability. Compared with the existing petrochemical polymer materials, the emission load of $CO_2$ in the production process of polylactic acid raw materials and products is only 50-75% of that in the production process of petrochemical raw materials (e.g., polyethylene/PE, polystyrene/PS, polypropylene/PP and polyethylene terephthalate/PET) and products; as compared with other chemically synthesized biodegradable polymer materials, the polylactic acid has a key feature of being derived from renewable plant resources and getting rid of the dependence on petroleum resources; in contrast with other biological source biodegradable polymer materials, the polylactic acid is the first bio-based and biodegradable plastic with large-scale industrialization, and has high biosynthesis conversion rate, low production cost and higher market competitiveness. Therefore, the development of polylactic acid degradable materials is extremely indispensable for alleviating global environmental and energy problems. However, PLA per se has the defects such as severe brittleness and poor heat resistance, thus the PLA cannot be directly used for production of products.

At present, in order to manufacture the PLA products, the PLA shall be initially modified to prepare a PLA modified material, which is then used for the production of the PLA products.

CN107603168A discloses a polylactic acid-based thin film and a preparation method thereof, the method comprises mechanically blending polylactic acid and various modifiers, then subjecting the raw material mixture to melt extrusion by a double-screw extruder, carrying out water cooling, granulating and drying to obtain a polylactic acid modified material, subsequently blow molding the polylactic acid modified material by a film blowing machine to prepare a polylactic acid film product.

CN107141743A discloses a disposable effectively degradable environmental protection polylactic acid tableware and a preparation method thereof, the method comprises the steps of injecting the polylactic acid and a plurality of modifiers into a twin-screw extruder, carrying out extrusion granulation and vacuum drying to obtain polylactic acid particles, then preparing sheets with the polylactic acid particles according to requirements and subsequently carrying out calendaring or direct injection molding to produce the tableware.

However, the polylactic acid is very susceptible to thermal degradation during the course of processing, which results in the decreased molecular weight, thereby affecting mechanical properties of the products. Each of the existing methods for preparing polylactic acid products is involved with the secondary processing, which reduces the molecular weight and the mechanical property of polylactic acid and increases the production cost.

Therefore, the research and development of the device or method for online preparation of the modified polylactic acid material have important significance.

SUMMARY

The present disclosure aims to overcome the defects in the prior art that the poor mechanical property and high production cost caused by thermal degradation which easily occurs in the preparation process of polylactic acid, and provide a device and method for online preparation of a modified polylactic acid material with a polylactic acid melt. The method can avoid degradation of the polylactic acid caused by the secondary processing, improve mechanical property of the prepared polylactic acid and reduce production cost.

In order to fulfill the above purposes, a first aspect of the present disclosure provides a device for online preparation of a modified polylactic acid material with a polylactic acid melt, wherein the device comprises a twin-screw extruder, a first solid modifier hopper 8, a polylactic acid melt pipeline 15 and a polylactic acid melt feedstock metering pump 10, the first solid modifier hopper 8 is connected with Zone I 2 of the twin-screw extruder, the polylactic acid melt pipeline 15 is connected with Zone IV 4 of the twin-screw extruder.

A second aspect of the present disclosure provides a method for online preparation of a modified polylactic acid material, wherein the method is performed in a device for online preparation of a modified polylactic acid material, the method comprises:

(a) feeding the polylactic acid melt into a Zone IV 4 of the twin-screw extruder through a polylactic acid melt pipeline 15;

(b) adding a first solid modifier into a Zone I 2 of the twin-screw extruder via a first solid modifier hopper 8;

(c) feeding a liquid modifier into a Zone II of the twin-screw extruder through a liquid feedstock metering pump 12;

(d) contacting the polylactic acid melt, the first solid modifier and the liquid modifier in Zone V 5 of the twin-screw extruder to Zone XI of the twin-screw extruder, and extruding and granulating the obtained modified polylactic acid polymerization melt;

wherein, the device for online preparation of a modified polylactic acid material is the aforementioned device.

By means of the aforementioned technical solution, the present application produces the favorable effects as follows: the online modification of the polylactic acid melt obtained by polymerization is performed by online addition of the modifiers, such that the secondary processing may be omitted, it can significantly reduce the production cost, and prevent the degradation of the polylactic acid due to the secondary processing, thereby ensuring the excellent performance of the final product.

BRIEF DESCRIPTION OF THE DRAWINGS

FIG. 1 is a schematic view of a device for online preparation of a modified polylactic acid material according to the present disclosure.

DESCRIPTION OF THE REFERENCE SIGNS

1. Motor
2. Zone I of the twin-screw extruder
3. Zones II to III of the twin-screw extruder
4. Zone IV of the twin-screw extruder
5. Zone V of the twin-screw extruder
6. Zones VI to XI of the twin-screw extruder
7. Headpiece of the twin-screw extruder
8. First solid modifier hopper
9. Second solid modifier hopper
10. Polylactic acid melt feedstock metering pump
11. First auxiliary material hopper
12. Liquid feedstock metering pump
13. Second auxiliary material hopper
15. Polylactic acid melt pipeline

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The present disclosure provides a device for online preparation of a modified polylactic acid material with a polylactic acid melt, wherein the device comprises a twin-screw extruder, a first solid modifier hopper 8, a polylactic acid melt pipeline 15 and a polylactic acid melt feedstock metering pump 10, the first solid modifier hopper 8 is connected with Zone I 2 of the twin-screw extruder, the polylactic acid melt pipeline 15 is connected with Zone IV 4 of the twin-screw extruder.

In the present disclosure, it shall be noted that the polylactic acid melt is prepared by COFCO Biochemistry Co., Ltd., and the preparation method comprises the following steps: subjecting lactide to polymerization and devolatilization procedures to obtain a polylactic acid melt; wherein the lactide is purchased from Total Corbion PLA (Thailand) Ltd., with a product name Lumilact® L, a net weight 600 kg, a model number L85 and a purity 99.5%.

According to the present disclosure, the device further comprises a second solid modifier hopper 9 and a second auxiliary material hopper 13, wherein the second solid modifier hopper 9 is connected with a Zone I 2 of the twin-screw extruder; the second auxiliary material hopper 13 is connected with a Zone V 5 of the twin-screw extruder.

According to the present disclosure, the device also comprises a first auxiliary material hopper 11, the first auxiliary material hopper 11 is connected to a Zone I 2 of the twin-screw extruder, and is used for feeding the powder auxiliary materials.

According to the present disclosure, the twin-screw extruder further comprises a liquid feedstock metering pump 12, and the liquid feedstock metering pump 12 is connected with the Zone II of the twin-screw extruder.

As shown in FIG. 1, i.e., the schematic diagram of a device for online preparation of a modified polylactic acid material according to the present disclosure, the twin-screw extruder further comprises a motor 1 and a headpiece 7 of the twin-screw extruder; in addition, a Zone I 2 of the twin-screw extruder, Zones II to III 3 of the twin-screw extruder, a Zone IV 4 of the twin-screw extruder, a Zone IV 5 of the twin-screw extruder, and Zones VI to XI of the twin-screw extruder are as shown in FIG. 1.

A second aspect of the present disclosure provides a method for online preparation of a modified polylactic acid material, wherein the method is performed in a device for online preparation of a modified polylactic acid material, the method comprises:

(a) feeding the polylactic acid melt into a Zone IV 4 of the twin-screw extruder through a polylactic acid melt pipeline 15;

(b) adding a first solid modifier into a Zone I 2 of the twin-screw extruder via a first solid modifier hopper 8;

(c) feeding a liquid modifier into a Zone II of the twin-screw extruder through a liquid feedstock metering pump 12;

(d) contacting the polylactic acid melt, the first solid modifier with the liquid modifier in Zone V 5 of the twin-screw extruder to Zone XI of the twin-screw extruder, and extruding and granulating the obtained modified polylactic acid polymerization melt;

wherein the device for online preparation of a modified polylactic acid material is the aforementioned device.

According to the present disclosure, the liquid modifier is one or more selected from the group consisting of epoxidized soybean oil, tributyl citrate and adipic acid diethylene glycol monobutylether ester.

Wherein the epoxidized soybean oil (ESO) is a light yellow viscous oily liquid under the normal temperature, the molecular formula is $C_{57}H_{106}O_{10}$, the molecular weight is 950, the epoxy value is greater than or equal to 6.60, the iodine value is less than or equal to 3.0, the higher is the epoxy value of the ESO, the better is the heat resistance, the lower is the iodine value, the better is the compatibility with polyvinyl chloride (PVC), the less easier it is precipitated.

Wherein the tributyl citrate is generally called tri-n-butyl citrate, the chemical name of the tributyl citrate is 3-hydroxy-3-carboxyl glutaric acid tributyl ester, which is an ester compound.

According to the present disclosure, the dosage of the polylactic acid melt is 49.5-79 wt %, the dosage of the first solid modifier is 20-50 wt %, and the dosage of the liquid modifier is 0.2-0.5 wt %, based on the total weight of the modified polylactic acid melt; preferably, the dosage of the polylactic acid melt is 53-66.8 wt %, the dosage of the first solid modifier is 25-35 wt %, and the dosage of the liquid modifier is 0.2-0.3 wt %, based on the total weight of the modified polylactic acid melt. In the present disclosure, the total amount of dosages of the polylactic acid melt, the first solid modifier and the liquid modifier is 100%.

According to the present disclosure, the method further comprises: in step (b), the first solid modifier is fed into the Zone I 2 of the twin-screw extruder via a first solid modifier hopper 8, and a second solid modifier is fed into the Zone I 2 of the twin-screw extruder via a second solid modifier hopper 9.

According to the present disclosure, the first solid modifier and the second solid modifier are identical or different, each is a toughening agent and/or a reinforcing agent.

In the present disclosure, the toughening agent is one or more selected from the group consisting of polybutylene adipate terephthalate, polypropylene carbonate, polybutylene succinate, polytetramethylene glycol-succinic acid/adipic acid copolyester, it is preferably polybutylene adipate terephthalate and/or polypropylene carbonate.

In the present disclosure, the reinforcing agent is talc and/or calcium carbonate.

According to the present disclosure, the dosage of the polylactic acid melt is 49.5-79 wt %, the dosage of the first solid modifier is 20-50 wt %, the dosage of the second solid modifier is 0-7 wt %, and the dosage of the liquid modifier is 0.2-0.5 wt %, based on the total weight of the modified polylactic acid melt; preferably, the dosage of the polylactic acid melt is 53-66.8 wt %, the dosage of the first solid modifier is 25-35 wt %, the dosage of the second solid modifier is 3-7 wt %, and the dosage of the liquid modifier is 0.2-0.3 wt %, based on the total weight of the modified polylactic acid melt. In the present disclosure, the total amount of dosages of the polylactic acid melt, the first solid modifier, the second solid modifier and the liquid modifier is 100%.

According to the present disclosure, the method further comprises: in step (d), contacting the polylactic acid melt, the first solid modifier and the liquid modifier with the auxiliary material, wherein the auxiliary material is fed into the Zone V 5 of the twin-screw extruder via the second auxiliary material hopper 13.

According to the present disclosure, the auxiliary material is one or more selected from the group consisting of a chain extender, a cross-linking agent, an antioxidant and a lubricant.

According to the present disclosure, the dosage of the polylactic acid melt is 49.5-79 wt %, the dosage of the first solid modifier is 20-50 wt %, the dosage of the liquid modifier is 0.2-0.5 wt %, the dosage of the chain extender is 0-0.3 wt %, the dosage of the cross-linking agent is 0-0.3 wt %, the dosage of the antioxidant is 0-0.5 wt %, and the dosage of the lubricant is 0-0.4 wt %, based on the total weight of the modified polylactic acid melt; preferably, the dosage of the polylactic acid melt is 53-66.8 wt %, the dosage of the first solid modifier is 25-35 wt %, the dosage of the liquid modifier is 0.2-0.3 wt %, the dosage of the chain extender is 0.1-0.2 wt %, the dosage of the cross-linking agent is 0.1-0.2 wt %, the dosage of the antioxidant is 0.2-0.3 wt %, and the dosage of the lubricant is 0.2-0.3 wt %, based on the total weight of the modified polylactic acid melt. In the present disclosure, the total amount of the dosages of the polylactic acid melt, the first solid modifier, the liquid modifier, the chain extender, the crosslinking agent, the antioxidant and the lubricant is 100%.

The present disclosure also provides a modified polylactic acid material prepared with the aforementioned method.

The present disclosure will be described in detail below with reference to examples.

In the following Examples and Comparative Examples:

(1) Mechanical Property Measurement

In the present disclosure, the tensile strength and the elongation at break were tested by an intelligent electronic tensile testing machine, and the instrument with a model number XLW was purchased from the Jinan Labthink Electromechanical Technology Co., Ltd.

(2) Weight Average Molecular Weight

In the present disclosure, the weight average molecular weight was measured by using a gel permeation chromatograph.

(3) Source of Raw Materials

The polybutylene adipate terephthalate was purchased from Xinjiang Blue Ridge Tunhe Chemical Industry Joint Stock Co., Ltd.;

The polypropylene carbonate was purchased from the Inner Mongolia Mengxi High-tech New Material Joint Stock Co., Ltd.;

The polybutylene succinate was purchased from the BASF SE;

The polytetramethylene glycol-succinic acid/adipic acid copolyester was purchased from the Kingfa science and technology Co., Ltd.;

The talc was purchased from Shanghai Chengzhi Chemical Products Co., Ltd.;

The calcium carbonate was purchased from Zhejiang Tianshi Nanometer Science and Technology Co., Ltd.;

The tributyl citrate was purchased from Meryer (Shanghai) Chemical Technology Co., Ltd.;

The epoxidized soybean oil was purchased from Dongguan Hentai Chemical Co., Ltd.;

The adipic acid diethylene glycol monobutylether ester (DGBEA) was purchased from Changchun Institute of Applied Chemistry (CIAC);

The chain extenders were purchased from the BASF SE;

The crosslinking agent was purchased from Dongguan Huanzong Trade Co., Ltd.;

The antioxidant was purchased from Tianjin Rainlon New Materials Co., Ltd.;

The lubricant was purchased from the Sichuan Tianyu Oil Chemical Co., Ltd.

Example 1

This example aimed to illustrate a modified polylactic acid material prepared with the device and method of the present disclosure.

As shown in FIG. 1:

(a) 59.1 parts by weight of polymerized polylactic acid melt were continuously output via the polylactic acid melt pipeline 15 and fed into a polylactic acid melt feedstock metering pump 10 (hereinafter referred to as "melt feedstock metering pump"), and subsequently continuously output and fed into Zone IV 4 of the twin-screw extruder;

(b) 35 parts by weight of a first solid modifier polybutylene adipate terephthalate and 5 parts by weight of a second solid modifier talc were respectively added into a first solid modifier hopper 8 and a second solid modifier hopper 9;

(c) 0.3 part by weight of liquid modifier tributyl citrate was passed through a liquid feedstock metering pump 12 and fed into a Zone II of the twin-screw extruder in a lateral feeding mode;

(d) 0.1 part by weight of chain extender, 0.1 part by weight of cross-linking agent, 0.2 part by weight of antioxidant and 0.2 part by weight of lubricant were uniformly mixed and then added into a second auxiliary material hopper 13, and 100 parts by weight of the prepared modified polylactic acid polymerization melt was uniformly blended in Zones V to XI of a twin-screw extruder and then extruded and granulated.

The modified polylactic acid material was prepared as a consequence.

Example 2

This example aimed to illustrate a modified polylactic acid material prepared with the device and method of the present disclosure.

As shown in FIG. 1:

(a) 53 parts by weight of polymerized polylactic acid melt were continuously output via the polylactic acid melt pipeline 15 and fed into a polylactic acid melt feedstock metering pump 10 (hereinafter referred to as "melt feedstock metering pump"), and subsequently continuously output and fed into Zone IV of the twin-screw extruder;

(b) 39 parts by weight of a first solid modifier polybutylene adipate terephthalate and 7 parts by weight of a second solid modifier talc were respectively added into a first solid modifier hopper 8 and a second solid modifier hopper 9;

(c) 0.2 part by weight of liquid modifier epoxidized soybean oil was passed through a liquid feedstock metering pump 12 and fed into a Zone II of the twin-screw extruder in a lateral feeding mode;

(d) 0.2 part by weight of chain extender, 0.1 part by weight of cross-linking agent, 0.3 part by weight of antioxidant and 0.2 part by weight of lubricant were uniformly mixed and then added into a second auxiliary material hopper 13, and 100 parts by weight of the prepared modified polylactic acid polymerization melt was uniformly blended in Zones V to XI of a twin-screw extruder and then extruded and granulated.

The modified polylactic acid material was prepared as a consequence.

Examples 3-7

The modified polylactic acid material was prepared with the same device and method as in Example 1, except for that the first solid modifier, the second solid modifier, the liquid modifier, the chain extender, the crosslinking agent, the antioxidant and the lubricant in Example 1 were modified accordingly, as shown in Table 1.

TABLE 1

To prepare 100 parts by weight of a modified polylactic acid polymerization melt

| Unit (part by weight) | Polylactic acid melt | First solid modifier | Second solid modifier | Liquid modifier |
|---|---|---|---|---|
| Example 3 | 66.3 | 25 Polypropylene carbonate | 5 Talc | 0.3 Epoxidized soybean oil |
| Example 4 | 64 | 25 Adipic acid succinate | 7 Talc | 0.3 Adipic acid diethylene glycol monobutylether ester |
| Example 5 | 66.8 | 25 Polybutylene glycol-succinic acid/adipic acid copolyester | 5 Talc | 0.3 Tributyl citrate |
| Example 6 | 64.1 | 30 Polypropylene carbonate | 3 Calcium carbonate | 0.3 Tributyl citrate |
| Example 7 | 57.3 | 35 Polybutylene succinate | 5 Calcium carbonate | 0.3 Epoxidized soybean oil |

| Unit (part by weight) | Chain extender | Crosslinking agent | Antioxidant | Lubricant |
|---|---|---|---|---|
| Example 3 | 0.1 | 0.1 | 0.2 | 0.3 |
| Example 4 | 0.15 | 0.15 | 0.3 | 0.4 |

TABLE 1-continued

To prepare 100 parts by weight of a modified polylactic acid polymerization melt

| Example 5 | 0.2 | 0.1 | 0.2 | 0.2 |
|---|---|---|---|---|
| Example 6 | 0.1 | 0.2 | 0.3 | 0.3 |
| Example 7 | 0.1 | 0.2 | 0.2 | 0.2 |

Comparative Example 1

The modified polylactic acid material was prepared according to the same method as in Example 2, except for that the blown film grade polylactic acid chips manufactured by COFCO were used, and according to the formulation of Example 2, 53 parts by weight of polylactic acid chips were mechanically mixed with 39 parts by weight of polybutylene adipate terephthalate, 7 parts by weight of talc, 0.2 parts by weight of epoxidized soybean oil, 0.2 parts by weight of chain extender, 0.1 part by weight of cross-linking agent, 0.3 part by weight of antioxidant, and 0.2 part by weight of lubricant, and then extruded by a twin-screw extruder for granulation.

The modified polylactic acid material was prepared as a consequence.

Comparative Examples 2-6

The modified polylactic acid material was prepared with the same device and method as in Example 1, except for that the content of the polylactic acid melt and the content of the first solid modifier and the second solid modifier were different, as shown in Table 2.

TABLE 2

To prepare 100 parts by weight of a modified polylactic acid polymerization melt

| Unit (part by weight) | Polylactic acid melt | First solid modifier | Second solid modifier | Liquid modifier |
|---|---|---|---|---|
| Comparative Example 2 | 80.0 | 17 Polypropylene carbonate | 2 Talc | 0.3 Epoxidized soybean oil |
| Comparative Example 3 | 82.0 | 15 Polybutylene succinate | 1 Talc | 0.1 Adipic acid diethylene glycol monobutylether ester |
| Comparative Example 4 | 51.0 | 40 Polybutylene glycol-succinic acid/adipic acid copolyester | 8 Talc | 0.3 Tributyl citrate |
| Comparative Example 5 | 46.2 | 36 Polypropylene carbonate | 9 Calcium carbonate | 0.3 Tributyl citrate |
| Comparative Example 6 | 80.4 | 15 Polybutylene succinate | 2 Calcium carbonate | 0.6 Epoxidized soybean oil |

| Unit (part by weight) | Chain extender | Crosslinking agent | Antioxidant | Lubricant |
|---|---|---|---|---|
| Comparative Example 2 | 0.1 | 0.1 | 0.2 | 0.3 |
| Comparative Example 3 | 0.4 | 0.4 | 0.6 | 0.5 |
| Comparative Example 4 | 0.2 | 0.1 | 0.2 | 0.2 |

TABLE 2-continued

To prepare 100 parts by weight of a modified polylactic acid polymerization melt

| | | | | |
|---|---|---|---|---|
| Comparative Example 5 | 0.1 | 0.2 | 0.3 | 0.3 |
| Comparative Example 6 | 0.5 | 0.5 | 0.5 | 0.5 |

Test Example

The modified polylactic acid materials prepared in Examples 1-7 and Comparative Examples 1-6 were subjected to tests of tensile strength and elongation at break, and the results were shown in Table 3.

TABLE 3

| Samples | Weight average molecular weight (g/mol) | Tensile strength (MPa) | Elongation at break (%) | Production cost (yuan/ton) |
|---|---|---|---|---|
| Comparative Example 1 | 154,059 | 45.0 | 98 | 4,600 |
| Comparative Example 2 | 178,265 | 46.8 | 108 | 3,100 |
| Comparative Example 3 | 178,398 | 50.2 | 103 | 3,100 |
| Comparative Example 4 | 179,115 | 51.9 | 105 | 3,100 |
| Comparative Example 5 | 178855 | 50.6 | 99 | 3,100 |
| Comparative Example 6 | 179,065 | 52.0 | 100 | 3,100 |
| Example 1 | 179,174 | 55.0 | 120 | 3,100 |
| Example 2 | 184,059 | 56.2 | 125 | 3,100 |
| Example 3 | 180,243 | 54.8 | 118 | 3,100 |
| Example 4 | 183,224 | 53.1 | 109 | 3,100 |
| Example 5 | 179,986 | 52.9 | 121 | 3,100 |
| Example 6 | 183,054 | 56.0 | 120 | 3,100 |
| Example 7 | 181,752 | 52.3 | 119 | 3,100 |

As can be seen from the results in Table 3, the polylactic acid modified materials prepared in Examples 1-7 of the present disclosure have superior properties, wherein the polylactic acid modified material prepared in Example 2 of the present disclosure has excellent properties, the weight average molecular weight is 184,059 g/mol, the tensile strength is 56.2 MPa, and the elongation at break is 125%.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A method for online preparation of a modified polylactic acid material, wherein the method is performed in a device for online preparation of a modified polylactic acid material, and the method comprises:
   (a) feeding the polylactic acid melt into a Zone IV of the twin-screw extruder through a polylactic acid melt pipeline;
   (b) adding a first solid modifier into a Zone I of the twin-screw extruder via a first solid modifier hopper;
   (c) feeding a liquid modifier into a Zone II of the twin-screw extruder through a liquid feedstock metering pump;
   (d) contacting the polylactic acid melt, the first solid modifier with the liquid modifier in Zone V of the twin-screw extruder to Zone XI of the twin-screw extruder, and extruding and granulating the obtained modified polylactic acid polymerization melt;
   wherein the dosage of the polylactic acid melt is 49.5-79 wt %, the dosage of the first solid modifier is 20-50 wt %, and the dosage of the liquid modifier is 0.2-0.5 wt %, based on the total weight of the modified polylactic acid melt;
   wherein the device comprises a twin-screw extruder, a first solid modifier hopper, a polylactic acid melt pipeline and a polylactic acid melt feedstock metering pump, and the first solid modifier hopper is connected with Zone I of the twin-screw extruder, the polylactic acid melt pipeline is connected with Zone IV of the twin-screw extruder;
   wherein the polylactic acid melt is obtained by subjecting lactide to polymerization and devolatilization;
   wherein the liquid modifier is one or more selected from the group consisting of epoxidized soybean oil, tributyl citrate and adipic acid diethylene glycol monobutylether ester;
   wherein the first solid modifier is a toughening agent and/or a reinforcing agent.

2. The method of claim 1, wherein the device further comprises a second solid modifier hopper and a second auxiliary material hopper, wherein the second solid modifier hopper is connected with a Zone I of the twin-screw extruder;
   wherein the second auxiliary material hopper is connected with a Zone V of the twin-screw extruder.

3. The method of claim 1, wherein the twin-screw extruder further comprises a liquid feedstock metering pump, and the liquid feedstock metering pump is connected with the Zone II of the twin-screw extruder.

4. The method of claim 2, wherein the method further comprises: in step (b), the first solid modifier is fed into the Zone I of the twin-screw extruder via a first solid modifier hopper, and the second solid modifier is fed into the Zone I of the twin-screw extruder via a second solid modifier hopper;
   wherein the second solid modifier is a toughening agent and/or a reinforcing agent.

5. The method of claim 4, wherein the dosage of the polylactic acid melt is 49.5-79 wt %, the dosage of the first solid modifier is 20-50 wt %, the dosage of the second solid modifier is 0-7 wt %, and the dosage of the liquid modifier is 0.2-0.5 wt %, based on the total weight of the modified polylactic acid melt.

6. The method of claim 5, wherein the dosage of the polylactic acid melt is 53-66.8 wt %, the dosage of the first solid modifier is 25-35 wt %, the dosage of the second solid modifier is 3-7 wt %, and the dosage of the liquid modifier is 0.2-0.3 wt %, based on the total weight of the modified polylactic acid melt.

7. The method of claim 2, wherein the method further comprises: in step (d), contacting the polylactic acid melt, the first solid modifier and the liquid modifier with the auxiliary material, wherein the auxiliary material is fed into the Zone V of the twin-screw extruder via the second auxiliary material hopper.

8. The method of claim 7, wherein the auxiliary material is one or more selected from the group consisting of a chain extender, a cross-linking agent, an antioxidant and a lubricant.

9. The method of claim 8, wherein the dosage of the polylactic acid melt is 49.5-79 wt %, the dosage of the first solid modifier is 20-50 wt %, the dosage of the liquid modifier is 0.2-0.5 wt %, the dosage of the chain extender is 0-0.3 wt %, the dosage of the cross-linking agent is 0-0.3 wt %, the dosage of the antioxidant is 0-0.5 wt %, and the dosage of the lubricant is 0-0.4 wt %, based on the total weight of the modified polylactic acid melt.

10. The method of claim 9, wherein the dosage of the polylactic acid melt is 53-66.8 wt %, the dosage of the first solid modifier is 25-35 wt %, the dosage of the liquid modifier is 0.2-0.3 wt %, the dosage of the chain extender is 0.1-0.2 wt %, the dosage of the cross-linking agent is 0.1-0.2 wt %, the dosage of the antioxidant is 0.2-0.3 wt %, and the dosage of the lubricant is 0.2-0.3 wt %, based on the total weight of the modified polylactic acid melt.

* * * * *